July 11, 1933. N. M. PERRINS 1,917,393

REENFORCING AND PROTECTING MOTION PICTURE AND SOUND FILM

Filed Oct. 28, 1930

Inventor,
Newton M. Perrins,

By

Attorney

Patented July 11, 1933

1,917,393

UNITED STATES PATENT OFFICE

NEWTON M. PERRINS, OF ROCHESTER, NEW YORK, ASSIGNOR TO EASTMAN KODAK COMPANY, OF ROCHESTER, NEW YORK, A CORPORATION OF NEW YORK

REENFORCING AND PROTECTING MOTION PICTURE AND SOUND FILM

Application filed October 28, 1930. Serial No. 491,732.

This invention relates to motion picture film and particularly to motion picture film having a photographic sound record beside the picture area. It relates more specifically to motion picture positives having the picture areas and sound tracks adjacent to each other.

In projecting motion pictures, and especially motion pictures with the sound record printed on the film beside the picture area, the film rapidly accumulates objectionable abrasion marks and scratches. Some of this abrasion occurs in the projection machine, as for instance at the gate from the pressure plates or shoes, and some of it occurs from the film continually rubbing against itself in the convolutions of the rolls in the feed and take-up spools. With motion picture film positives of any kind these scratches and abrasions eventually render the film unfit for use and greatly lessen its life. With sound motion picture positives the scratches and abrasions which occur in the picture area are of relatively little importance as they are not noticed unless very large or very numerous. Abrasion marks of any kind in the sound track, however, are very annoying as they give rise to a considerable amount of objectionable sound usually known as "ground noise." Sound films become useless relatively soon because of the increase of this ground noise to the point where the sound quality is practically ruined. Abrasion on sound films therefore becomes a factor of great importance, as the films do not have as long life as they do when the sound track is not present. It is the object of my invention to protect positive motion picture film from abrasion marks and scratches gradually accumulated from the causes mentioned, especially applying this to motion picture and sound films having a sound record beside the picture area, and a further object is to increase the wear of these films.

My invention is carried out by cementing along the length of the film, as for instance along the line of perforations, continuous threads or fibers of a cellulosic material, such as a viscose thread, rayon, or other cellulose derivative fiber. These threads or fibers are cemented to the film, on either the support side or the emulsion side, by means of a liquid which is a partial solvent for the thread and for the film or by means of a cement, such for instance as a cellulosic cement or cellulosic lacquer. When this is done the thread or fiber becomes integrally united with the film to form a projecting ridge of the order of .005 inch in width and a little less in thickness. In the figures, 5 represents these threads or fibers shown either along the line of perforations 4, beside the picture area 2 and the sound track 3 or at the very edge of the film.

It has been proposed to protect motion picture film by applying at or near its edge a silk thread attached by means of a cement. Silk or other threads heretofore proposed, however, are inclined to strip off rather easily. The method I propose overcomes this objection largely because the thread and the film become fused through the agency of an intermediate solvent or cement so that the thread or fiber becomes actually integrally united with the film and stripping becomes impossible. These threads or fibers cemented on in this way form projecting ridges along the edges of the film which serve to greatly strengthen the film, making it more resistant to wear and tear and they also serve to protect the surface from abrasion and scratching. When the film is wound on itself as is customary in the feed and take-up spools the surface of the film or the emulsion side is kept away from the next convolution and, particularly if the ridges are placed on the emulsion side, the emulsion is kept from contact with the shoes of the projector, thereby preventing the gradual scratching of the emulsion.

Figure 1:
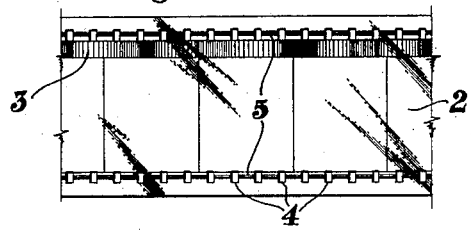
Fig. 1 is a top view of a sound and motion picture film showing the projecting ridges along the line of perforations.
Figure 2:
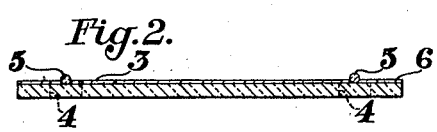
Fig. 2 is a cross section through the film of Fig. 1.
Figure 3:
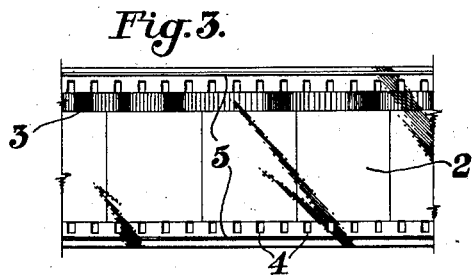
Figs. 3 and 4 are plan views showing the ridges in different positions.
Figure 4:
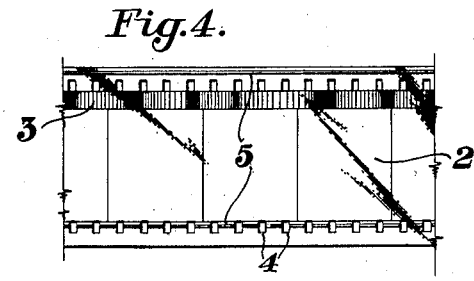

In carrying out the invention I use threads or fibers of a cellulosic nature such as viscose, cellulose nitrate, cellulose acetate, or any other thread of this nature. Many threads of this kind when suitably spun are known as artificial silk. In cementing these threads in place along the length of the film as mentioned, I may use any solvent which will attack and partially dissolve the thread and the base or I may use any cement which will securely unite the fiber to the film. Typical cements would include amyl acetate or acetone or a mixture of these with or without some film scrap in solution. When applied to the emulsion side, the cement would include acetic acid which attacks the gelatine. The diameter of the threads used would preferably be less than .005 inch. Preferably two threads are placed along the length of the film, one at either edge. They may be placed along the line of perforations on either the emulsion side or the support side or both, or may be placed elsewhere if the location of the sound track and picture area permits it. If placed along the line of perforations, this would be done prior to perforating. It will usually be most satisfactory to place these fibers or ridges along the border of the film (as shown in Figures 2 and 3) and on the emulsion layer 6 in the case of ordinary sound motion picture film. By so doing the sound track as well as the picture area of the film are protected from scratching and abrasion, and the life of the film is very much increased through the lessened wear on the film support itself. Another important advantage is that the film is less likely to tear during projection, thus obviating the necessity of patching or splicing and thereby breaking the continuity of the sound record.

The particular method of application is not vital as the threads may be wet with the solvent just prior to or at the moment of application, or the solvent may be applied to the support or to both support and thread, and the two then rolled into intimate contact, with or without the application of heat. In any event the amount of solvent is not excessive and evaporates rapidly permitting the film to be at once wound up.

It will be understood, of course, that the invention is applicable to ordinary motion picture film as well as film having a sound track thereon. It is, of course, especially suited for use with positive films which have to be projected again and again.

I consider as included within my invention all variations and equivalents coming within the scope of the appended claims.

What I claim is:

1. Motion picture positive film having along its length continuous threads of artificial silk of cellulosic composition integrally united to the surface of said film.

2. Motion picture positive film having along its length on the support side pre-formed continuous threads of artificial silk of cellulosic composition integrally united to the surface of said film.

3. Motion picture positive film having thereon adjacent picture areas and sound records and having along its lengths continuous threads of cellulosic composition integrally united to the surface of said film.

4. The method of forming a protecting ridge longitudinally of a film band composed of a cellulosic derivative that comprises applying to said band a pre-formed thread of artificial silk composed of a cellulosic derivative and applying to the thread and support a cement that is a solvent for both, whereby the thread is integrally united with the support.

5. The method of forming a protecting ridge longitudinally of a photographic film band that comprises wetting a thread of artificial silk composed of a cellulosic derivative with a solvent both for the thread and for the surface of the film band to which it is to be applied and applying the thread while wet to the surface of the film whereby a ridge is formed on said surface.

6. The method of forming a protecting ridge longitudinally of a film band composed of a cellulosic derivative which comprises wetting a pre-formed thread of artificial silk composed of a cellulose derivative with a solvent both for the thread and the band and applying the thread while wet to the surface of the film whereby a narrow ridge is formed on said surface.

7. The method of forming a protecting ridge longitudinally of a film band composed of a cellulosic derivative which comprises applying to the surface of said band a thread of artificial silk composed of a cellulosic derivative, causing the thread and the surface at the moment of application to be wet with a solvent to both, and applying pressure to the applied thread whereby it is integrally united with the film to form a narrow ridge thereon.

Signed at Rochester, New York this 21st day of October 1930.

NEWTON M. PERRINS.